April 5, 1966 A. E. TRAVER 3,243,997
ANALYZER FOR INTERNAL COMBUSTION ENGINES
Filed July 27, 1962 11 Sheets-Sheet 6
Fig. 7A
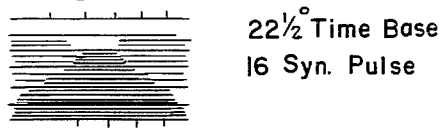
22½° Time Base
16 Syn. Pulse
Fig. 8A
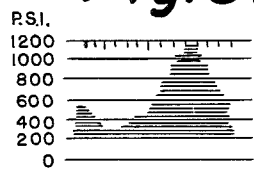
Fig. 7B
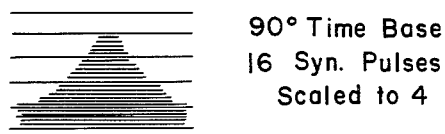
90° Time Base
16 Syn. Pulses
Scaled to 4
Fig. 8B
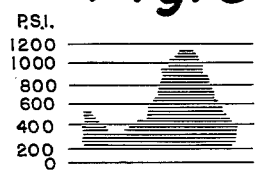
Fig. 9A
Fig. 9B
Fig. 10
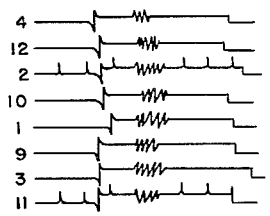
Fig. 10A
12 Cyl.
2 Cycle
Idle
270 RPM
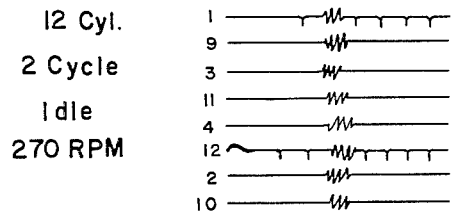
Fig. 10B
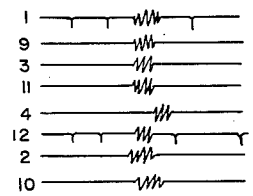

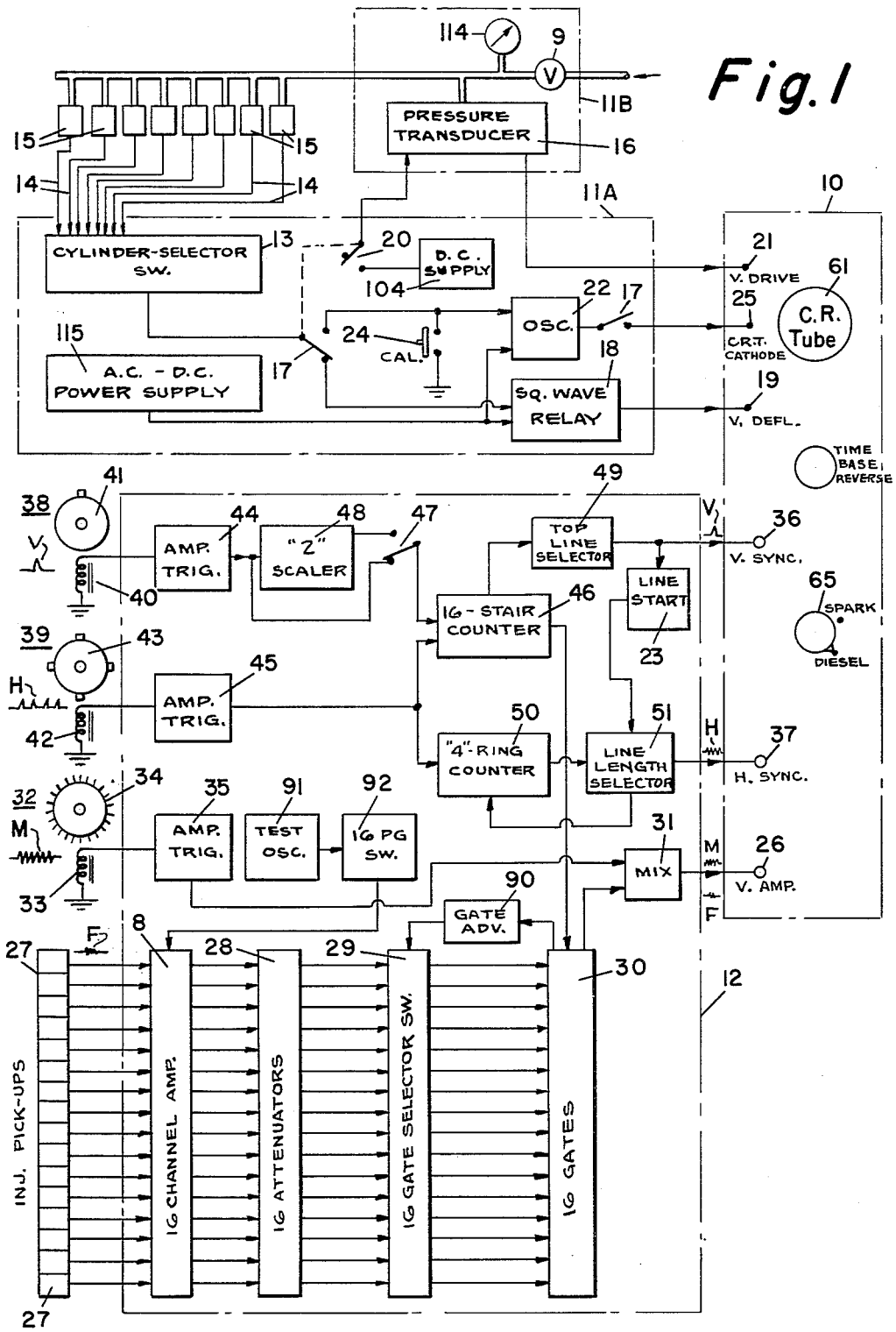

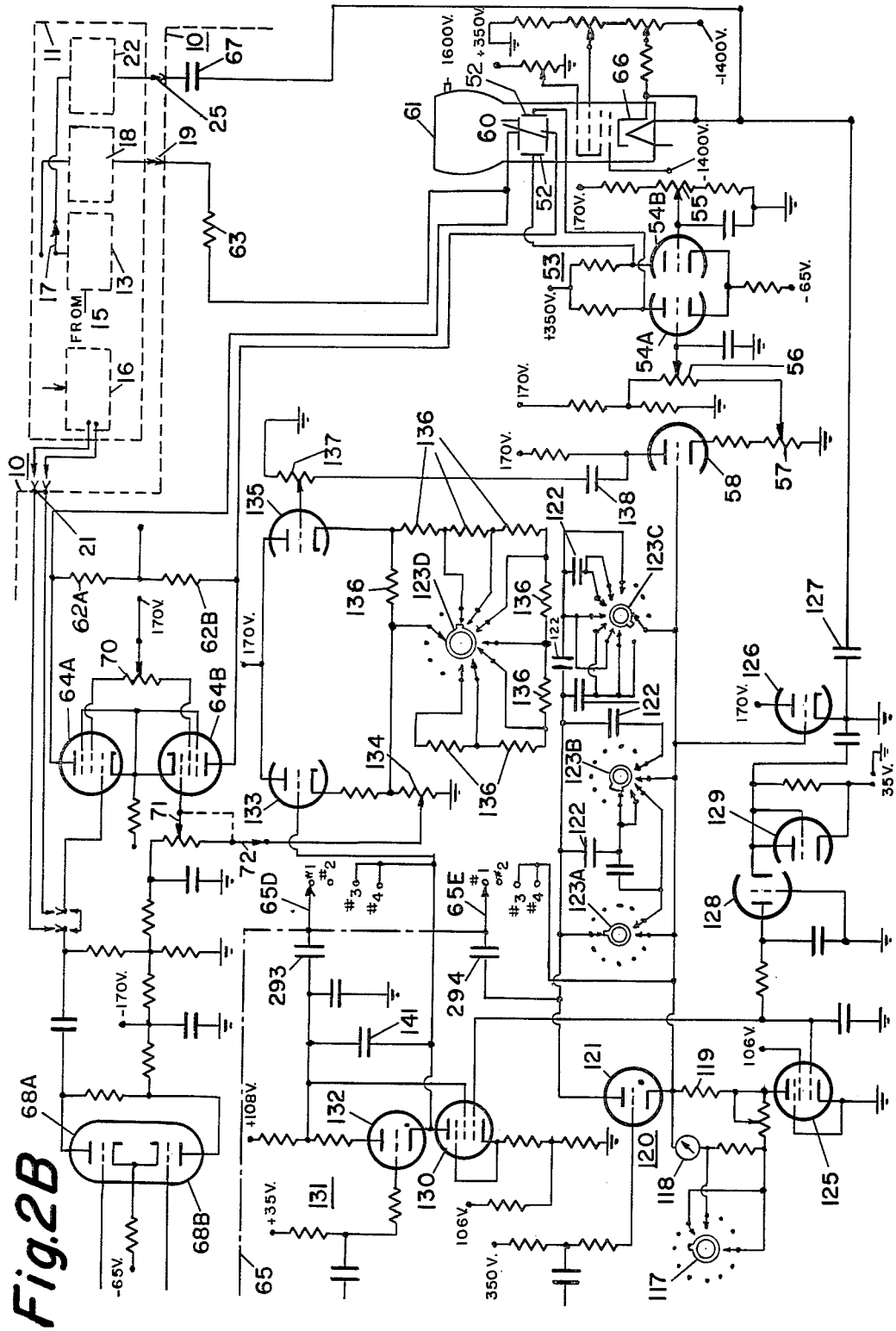

April 5, 1966 — A. E. TRAVER — 3,243,997
ANALYZER FOR INTERNAL COMBUSTION ENGINES
Filed July 27, 1962 — 11 Sheets-Sheet 7

April 5, 1966 A. E. TRAVER 3,243,997
ANALYZER FOR INTERNAL COMBUSTION ENGINES
Filed July 27, 1962 11 Sheets-Sheet 8

United States Patent Office 3,243,997
Patented Apr. 5, 1966

3,243,997
ANALYZER FOR INTERNAL COMBUSTION ENGINES
Alfred E. Traver, Great Neck, N.Y., assignor to Socony Mobil Oil Company, Inc., a corporation of New York
Filed July 27, 1962, Ser. No. 212,903
16 Claims. (Cl. 73—116)

This invention relates to oscilloscope systems for analyzing the operation of internal combustion engines and in part relates to improvements of the engine-analyzer systems disclosed in my copending applications Serial No. 44,070, filed July 20, 1960, upon which has issued U.S. Patent No. 3,101,611, and Serial No. 172,016, filed February 8, 1962.

In accordance with the present invention, the system may be utilized selectively to provide either an indicator-card display in which the raster lines of the oscilloscope tube correspond with different reference-pressures and have visible segments dependent upon the intervals for which the pressure of a selected cylinder exceeds reference-pressure or a display in which the raster lines respectively correspond with different selected cylinders and display any one or more various events, such as fuel-injection, firing time and/or cylinder pressure in excess of a preselected reference-pressure, occurring during the cycles of different cylinders.

More specifically, for the indicator-card display, there is provided an oscillator which is coupled to the cathode of the oscilloscope tube and normally is in a state corresponding with suppressed visibility of the beam trace and which is connected to a pressure-responsive switch, or equivalent, associated with the selected cylinder which changes the oscillator state during intervals for which the cylinder pressure exceeds an incrementally varied reference-pressure. For such display, vertical displacement of the raster lines is effected by the output of a transducer responsive to the reference-pressure. For display of the pressure relationships of different cylinders, a vertical-deflection electrode of the oscilloscope tube is connected to an electronic relay normally biased to cut-off. The cut-off bias of the relay is disabled by the pressure-responsive switches of selected cylinders for the intervals in their cycles for which cylinder pressure exceeds the selected reference-pressure.

Further in accordance with the present invention, the circuitry for synchronizing the vertical sweep generator of the oscilloscope includes pulse generators operating in synchronism with the engine and cylinder cycles, an electronic switch controlled by both pulse generators, and associated switching means which can be manually set to predetermine the position in the raster of the line corresponding with any cylinder. More specifically, the electronic switch means is of the stair type triggered by both pulse generators and the output of any of its stages may be manually selected for synchronization of the vertical sweep generator.

Further in accordance with the present invention, the circuitry for synchronizing the horizontal sweep generator of the oscilloscope includes the corresponding one of the pulse generators and an electronic switch for selectively reducing the number of raster lines. More specifically, this electronic switch is a ring-counter and any of its output stages may be selected to provide the reset pulse and a synchronizing pulse for the horizontal sweep generator.

Further in accordance with the present invention, a series of electronic gates are respectively controlled by stages of the stair-counter in turn to connect to the vertical-deflection circuitry of the oscilloscope a series of vibration-sensitive detectors respectively associated with fuel-injection lines of the cylinders, each for a time corresponding with the length of a raster line so to eliminate from the fuel-injection display for one cylinder the background noise of the detectors associated with other cylinders. In addition, manually-operable switches are provided to permit each gate to be connected either to the corresponding detector of the series or to the next one in the series and to permit the detector for the first cylinder in the firing sequence of all engines to be connected selectively to gates normally connected to the last detector in the firing sequence for engines having a correspondingly different number of cylinders, for example, to the fourth, sixth, eighth, twelfth or sixteenth gate of the series.

Further in accordance with the invention, a manually-operable multi-pole, multi-point switch is provided to change the operating parameters and circuit constants of the sweep generators and their preamplifiers to adapt the system for testing of diesel and gasoline engines having either equal or unequal intervals between firing of their cylinders.

The invention further resides in engine-analyzer systems having novel and useful features of composition, combination and arrangement hereinafter described and claimed.

For a more detailed understanding of the invention, reference is made in the following description of a preferred embodiment thereof to the attached drawings in which:

FIG. 1 is a block diagram of the complete engine testing system;

FIGS. 2A and 2B jointly disclose the internal circuitry of the oscilloscope shown in FIG. 1;

FIG. 3 schematically shows the preferred internal circuitry and interconnections of those components of FIG. 1 concerned with providing either a square-wave display of cylinder pressure or an indicator-card display of cylinder pressure;

Figure 5A:
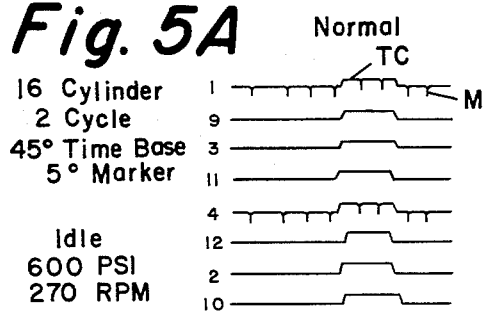
FIGS. 5A–5C are square-wave displays of cylinder pressure for selected engine cylinders at different reference-pressures and under different load conditions.
Figure 6A:
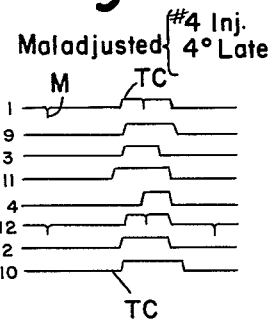
Figure 5B:
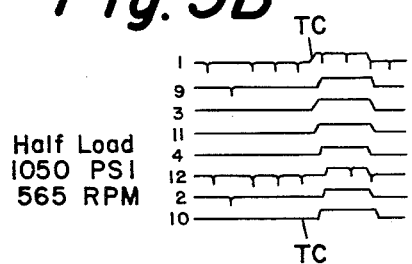
Figure 6B:
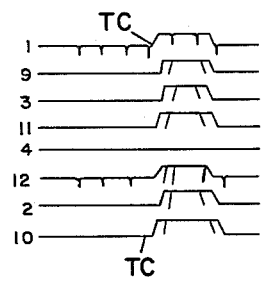
Figure 5C:
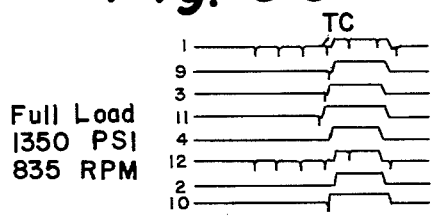
Figure 6C:
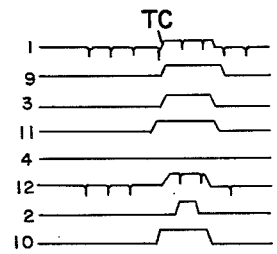
Figure 11:
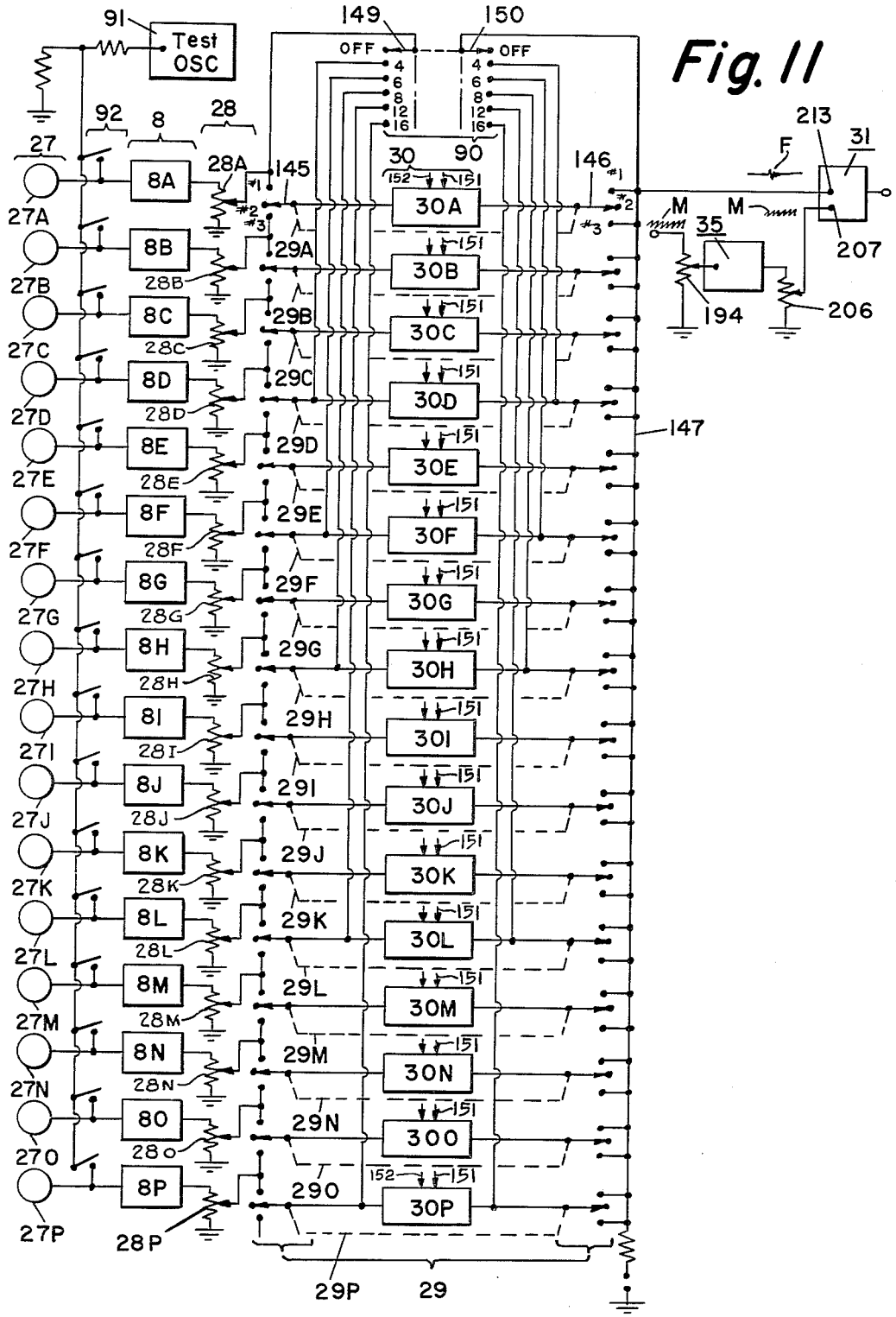
Figure 11A:
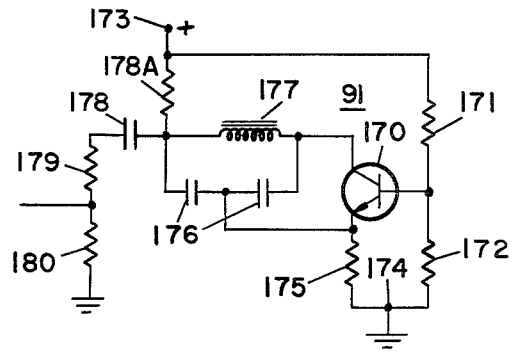
Figure 12:
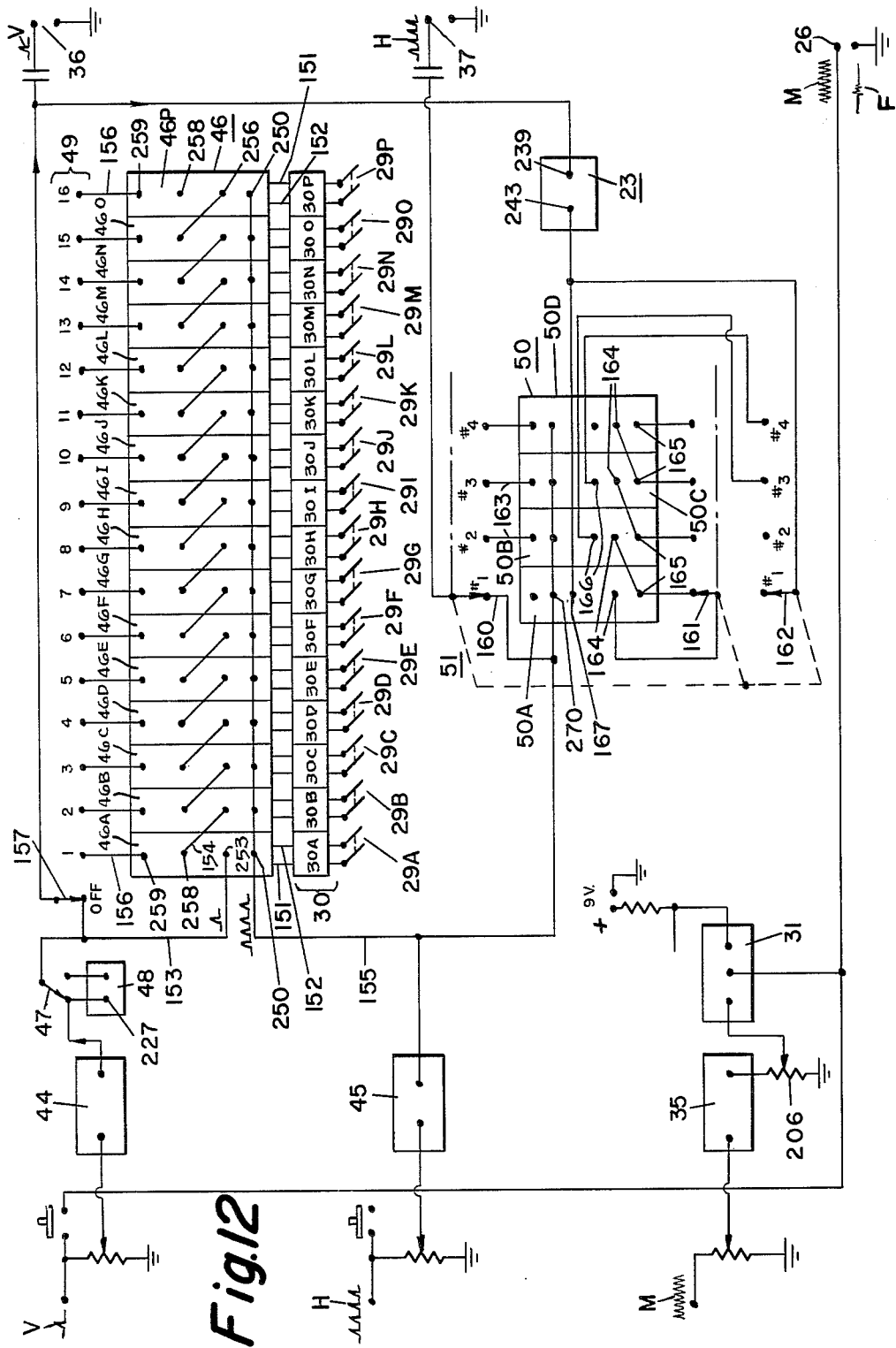
Figure 12A:
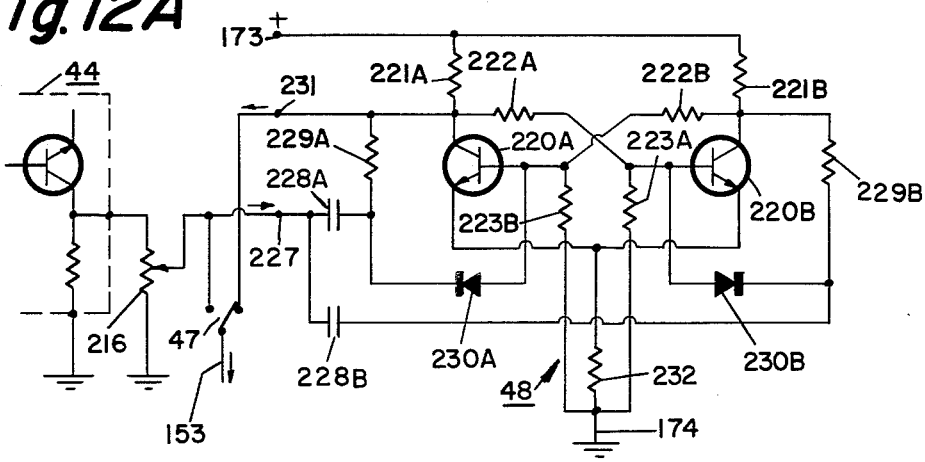
Figure 12B:
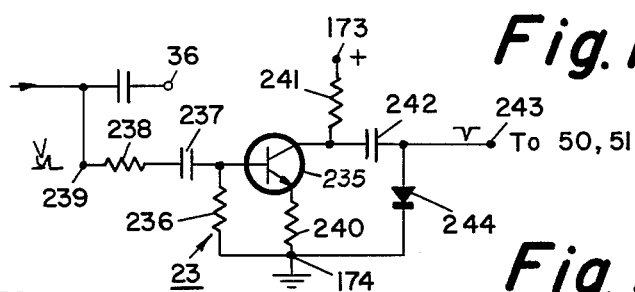
Figure 12C:
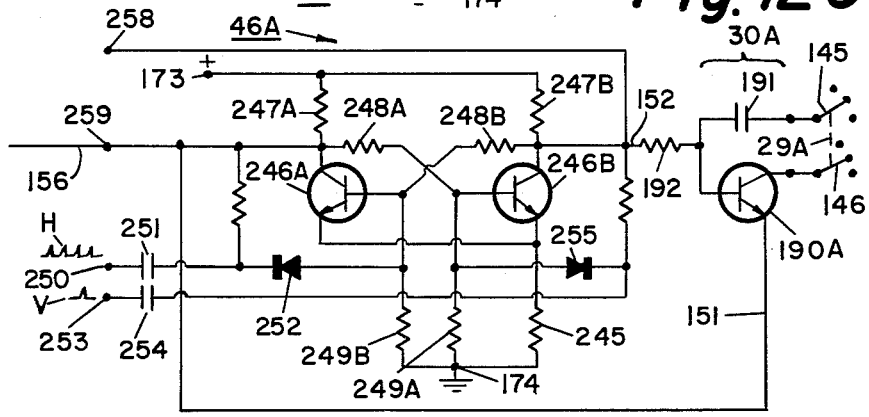
Figure 12D:
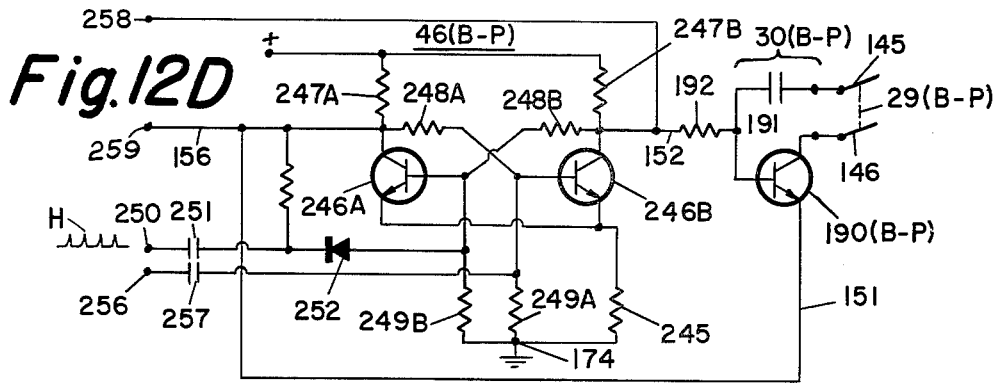
Figure 12E:
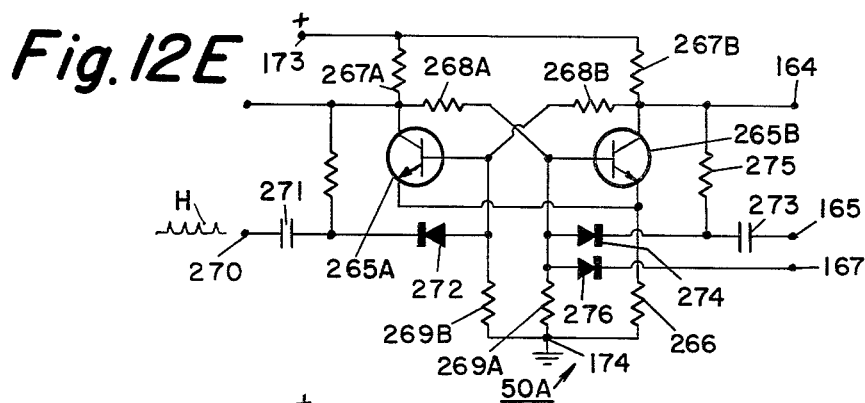
Figure 12F:
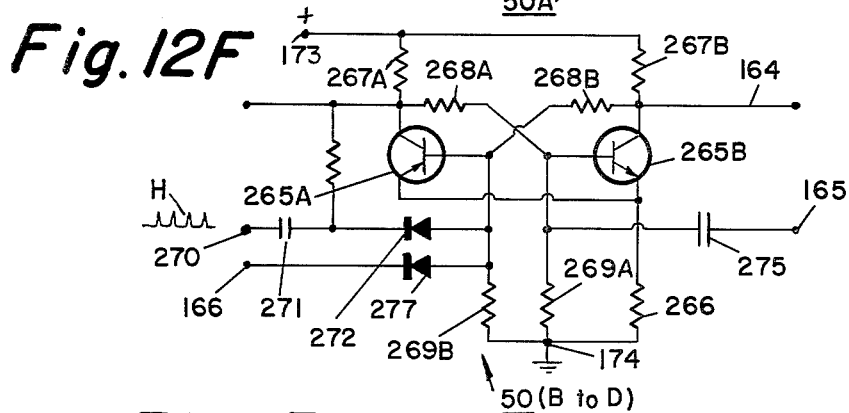
Figure 13:
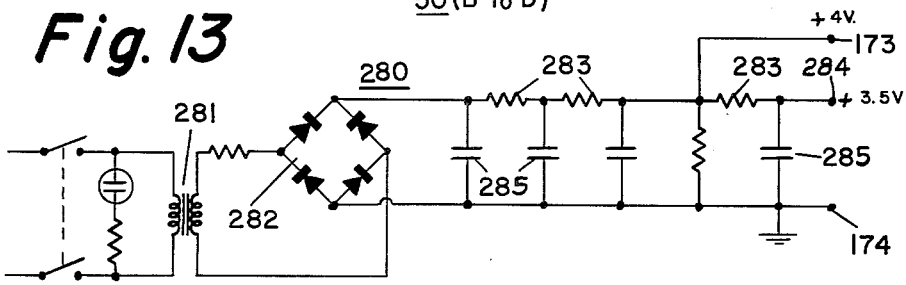

FIGS. 6A–6C respectively correspond with FIGS. 5A–5C but indicate improper operation of one cylinder;

FIGS. 7A–7B are indicator-card displays of cylinder pressure with different selected time-bases and different selected synchronizations;

FIGS. 8A and 8B are indicator-card displays showing the effect of different injection valves upon cylinder pressure;

FIGS. 9A and 9B are for comparison of a single line of a square-wave display of an indicator-card display, both for a single cylinder and with a single reference-pressure;

FIG. 10 is a square-wave display of cylinder pressure with a superimposed display of fuel injection;

FIGS. 10A and 10B show fuel-injection signals for selected engine cylinders;

FIG. 11 is a block diagram showing in more detail the switching and interconnections of correspondingly labeled components of FIG. 1;

FIGS. 11A–11E show the preferred internal circuitry of correspondingly labeled components of FIGS. 1 and 11;

FIG. 12 is a block diagram showing in more detail the switching and interconnections of correspondingly labeled components of FIG. 1;

FIGS. 12A–12F show the preferred internal circuitry of correspondingly labeled components of FIGS. 1 and 12; and FIG. 13 is a circuit diagram of a power supply for the components of FIGS. 11 and 12.

The engine testing system shown in block diagram in FIG. 1 comprises a cathode-ray oscilloscope 10; the control networks 11A, 11B for providing a cathode-ray presentation of cylinder pressure either as a raster whose respective lines display pressure time relations of different selected cylinders or whose lines jointly form a pressure indicator-card display for a single selected cylinder; and a network 12 for synchronizing the time-bases of the oscilloscope from engine-speed to obtain various selected time relationships to the engine cycle, to provide marker signals, to select which cylinder corresponds with the top line of the raster, and to include, for certain tests, a display of the fuel-injection characteristics of all or selected cylinders and on any selected line of the raster.

The control network 11A includes a cylinder-selector switch means 13 connected by cable 14 to the cylinder switches 15, which may be of type shown in Schlesman et al. Patent 2,085,203. Each of the switches 15 is closed when the pressure within the corresponding engine cylinder is in excess of a reference-pressure selected by adjustment of the reducing valve 9 of control panel 11B. The type of oscilloscope display is selected by switch 17 of control panel 11A.

With the display-selector switch 17 in the position shown in FIG. 1, the signals from the cylinder-selector switch 13 are routed via the square-wave relay 18 to the vertical-deflection input terminal 19 of the oscilloscope to provide a comparison display of the pressure of various cylinders—such as shown in any of FIGS. 5A–5C, FIGS. 6A–6C. For this type of display, the pressure transducer 16 may be disabled; as by switch 20, to have no effect upon the vertical-deflection circuitry connected within the oscilloscope to its input terminal 21. With switch 17 in its other closed-circuit position, the signals from a single cylinder pressure switch 15, as selected by switch means 13, are routed to the oscillator 22 whose output is applied to the Z axis input terminal 25 of the oscilloscope to afford an indicator-card display such as shown in each of FIGS. 7A–7B, 8A–8B. For this type of display, the pressure transducer 16 is enabled, as by closure of power switch 20, to apply to terminal 21 of the oscilloscope a signal proportional to the reference-pressure concurrently applied to the cylinder switches 15. The switch 24 may be closed at various known reference-pressures to provide calibration lines C in the indicator-card display.

The timing generator 38 is provided to produce one pulse V per cycle of the engine under test. This generator may comprise a magnetic pickup device 40 disposed adjacent a rotor 41 driven by or in synchronism with the engine crank shaft and having one pole-piece or equivalent flux-disturbing means. The pickup device 40 may be positioned to produce a signal pulse V each time the No. 1 piston passes top-dead-center. For a two-cycle engine, the switch 47 may be thrown to the position shown in FIG. 1 so that each V-pulse output of generator 38, as amplified and clipped by amplifier 44, is applied to an input of the counter 46. For a four-cycle engine, the switch 47 is thrown to its other position to include the binary scaler circuit 48 between amplifier 44 and counter 46 so that in effect only every other V-pulse output of generator 38 reaches the counter 46. The output pulses of counter 46 are applied through the top-line-selector 49 to terminal 36 of the oscilloscope for synchronization of its vertical sweep oscillator. The output pulses of counter 46 are also applied to the gate circuits 30 for purposes later discussed. The output pulses of the top-line-selector 49 are also applied to the line-start circuit 23.

The timing generator 39 is provided to produce one pulse H per cylinder cycle. This generator may comprise a magnetic pickup device 42 disposed adjacent a rotor 43 driven by or in synchronism with the engine crank shaft. The number and spacing of the rotor pole-pieces, or equivalent flux-changing means, and the relative position of the pickup device 42, are chosen to produce timing signals H respectively corresponding with the top-dead-center positions of the engine pistons. Each H-pulse output of generator 39, as repeated by the amplifier-clipper circuit 45, is applied to the stair-counter 46 and also to the ring-counter 50. The pulse output of counter 50 is applied through the line-length selector 51 to input terminal 37 of oscilloscope 10 for synchronization of its horizontal sweep oscillator. The line-length selector 51 may be set for any count of the ring-counter 50 from one to four before repeating. Thus, the counter 50 and the line-length selector provide for change in the number of lines in the C.R. (cathode-ray) raster without changing the engine synchronizing pickups 40, 42: for example, with the apparatus installed to form a 16-line raster, the line-length selector 51 can be set also to form either an eight or four-line raster.

The timing generator 32 is provided to produce a series of closely spaced pulses M with the spacings corresponding with small equal angles of the engine crank shaft. This generator may comprise a magnetic pickup device 33 disposed adjacent a rotor 34 driven by or in synchronism with the engine crank shaft and having pole-pieces suitably spaced at small intervals, for example, from five or ten degrees. The pulse output of marker generator 32, as repeated by the amplifier-clipper circuit 35, is applied to one input of the mixer circuit 31 whose output is applied to input terminal 26 of the oscilloscope for application to the vertical amplifier circuitry thereof.

The vibration-pickups 27 are respectively physically attached to the fuel-injection lines of the corresponding engine cylinders so that each produces a signal F during injection of fuel. The signal path from each of the vibration-pickups 27 to the mixer 31 includes a stage of the multi-channel amplifier 8, an attenuator 28 and one of the gates 30 selected by a selector switch 29. The output pulses from the counter 46 control the gates 30 to pass the injection signal F of each of the pickups 27 in their firing order sequence to the exclusion of the vibration background noise of the other pickups. The gates 30 are synchronized so that the start of fuel-injection for any selected cylinder can be seen on a raster line of the oscilloscope display. As will later appear, the gate advance selector 90 provides for simultaneously shifting the signal paths of all vibration signals so that each may appear on a raster line other than the one corresponding with the pressure display line for the associated cylinder.

By means of the multi-point switch 92, the output of test oscillator 91 may be selectively applied to any input of the multi-channel amplifier 8 to check the state of the signal path from any of the vibration-pickups 27.

Figure 2A:
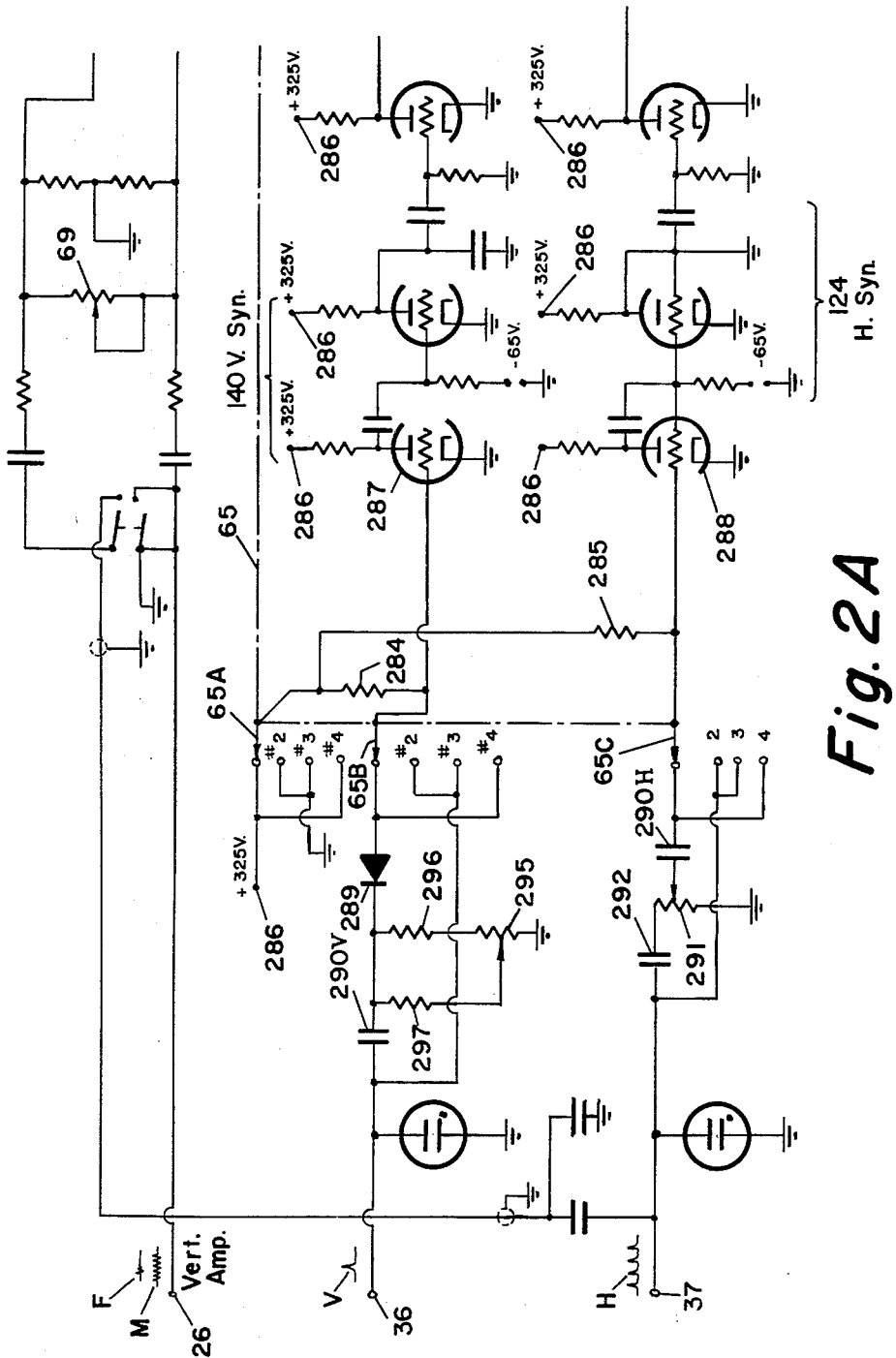

The internal circuitry of the oscilloscope block 10 is shown in FIGS. 2A and 2B. The vertical-deflection plates 60, 60 of the oscilloscope tube 61 are connected via the resistors 62A, 62B to the positive terminal of a suitable source of direct current. Additionally, one of the deflection plates 60 is connected via resistor 63 to input terminal 19 of the oscilloscope. Thus, when the display-selector switch 17 is in position to connect the cylinder switches 15 to the square-wave relay 18, the potential-difference of the vertical-deflection plates is modified for periods corresponding with unbalance of the pressure switches 15 in circuit.

The vertical-deflection plates 60, 60 of the oscilloscope tube 61 are also respectively connected to the anodes of the tube 64A, 64B forming the push-pull output stage of the vertical-deflection amplifier. The grid circuit of tube 64A is connected via input terminals 21 of the oscilloscope to the pressure transducer 16.

The cathode 66 of the C.R. tube 61 is connected via capacitor 67 to the Z axis input terminal 25 of the oscilloscope. Thus, when the switch 17 of network 11A is in position to connect a selected cylinder switch 13 to the oscillator 22, the brightness of the beam is controlled as a function of unbalanced cylinder pressure for production of the indicator-card type of display.

The horizontal-deflection plates 52, 52 of the cathode-ray tube 61 are coupled to the output of the horizontal-deflection amplifier 53 comprising tubes 54A and 54B. The resistance 55 in the grid-biasing circuit of tube 54B is adjustable to select the starting position of the beam spot at the beginning of a horizontal sweep. The resistance 56 in the grid circuit of tube 54A is adjustable to vary the sensitivity of amplifier 53 to the horizontal-sweep signals and so adjust the length of the raster lines. The resistor 57 common to the grid circuit of amplifier tube 54A and to the cathode circuit of preamplifier tube 58 is adjustable to provide a suitable line-start clamp bias for successive lines of the raster.

The grid of the horizontal preamplifier tube 58 is connected to the output circuit of the horizontal sweep oscillator 120 including the gaseous discharge tube 121. The anode circuit of tube 121 includes a selected combination of capacitors 122, as predetermined by the setting of the ganged wafer-switches 123A–123C. In the interval between successive conduction periods of tube 121, as effected by the pulses H applied to input terminal 37 of the oscilloscope and amplified by its horizontal synchronizing amplifier 124, the selected capacitors 122 are charged by the anode current of tube 125 in the cathode circuit of sweep oscillator tube 121. During such intervals, the grid potential of preamplifier tube 58 falls at a rate preset by switches 123A–123C. Each time tube 121 is fired, it affords a low resistance path for discharge of capacitors 122, and accordingly the grid potential of tube 58 is abruptly increased for a fast return sweep of the cathode-ray beam.

The voltmeter 118 in shunt to resistor 119 between the cathode of the horizontal oscillator tube 121 and the anode of the charging tube 125 is calibrated in revolutions per minute and serves as a tachometer for the engine under test.

The voltmeter 118 has two speed ranges, either of which may be selected by switch 117. The sawtooth output of horizontal sweep oscillator 120 is also applied to the grid of tube 126 whose cathode is connected via capacitor 127 to the cathode of the cathode-ray tube 61 so to suppress or blank out the return traces of the cathode-ray spot. The sawtooth wave as appearing at the cathode of tube 126 is also applied to the rectifiers 128, 129 to provide grid bias for the charging tube 125 of the horizontal sweep oscillator 120 and also for the charging tube 130 of the vertical sweep oscillator 131.

The cathode of the vertical sweep oscillator tube 132 is connected to the grid of tube 133 of the vertical drive circuit. The cathode circuits of tubes 133 and 135 include the resistor 134; the cathode circuit of tube 135 additionally includes a resistance means 136 adjustable step-by-step by wafer-switch 123D to correspond with the number of cylinders of the engine under test. The tilt adjustment potentiometer 137 in the grid circuit of tube 135 of the vertical drive circuit is coupled by capacitor 138 to the anode circuit of preamplifier tube 58 of the horizontal deflection amplifier 53.

The V-pulses as applied to the input terminal of the oscilloscope 10 are amplified by the tubes of the vertical synchronization amplifier 140 and applied to the grid of the vertical sweep oscillator tube 132. In the interval between successive V-pulses, the capacitor 141 in the anode-cathode circuit of tube 132 is charged by the anode current of the tube 132. Each time that the gaseous discharge tube 130 is triggered to conductive state, it provides a discharge path for capacitor 141. The abrupt change in the cathode potential of tube 132 as applied to the grid of tube 133, with resultant change of its cathode current and the grid bias of tube 64B, causes the cathode beam spot to return to the starting position for the top raster line. The vertical drive pulses applied to the grid circuit of tube 135 from the output of the preamplifier tube 58 of the horizontal drive circuit is effective vertically to displace the beam spot for the next lower and subsequent lines of the raster. The potentiometer 71 in the grid circuit of amplifier tube 64B is adjustable to select the spacing between lines of the raster. The potentiometer 70 in the screen-grid circuits of amplifier tubes 64A, 64B is to provide for vertical centering of the raster. For display of marker pulses M and/or fuel-injection pulses F, the vertical-deflection amplifier tubes 64A, 64B are also driven by the preamplifier tubes 64A, 64B effectively connected to the input terminal 26 of the oscilloscope 10. The variable resistor 69 in the input circuit of the preamplifier is for control of sensitivity.

Basically, the internal circuitry of the oscilloscope 10 is generally the same as that disclosed in my aforesaid copending application Serial No. 172,016 which is primarily concerned with testing of gasoline engines having spark ignition systems. The oscilloscope of the present application may be used for testing both diesel and gas engines by setting the five-pole, four-position switch 65 (FIG. 2A) to its proper position.

For the No. 1 position of switch 65, which is the setting for testing gasoline engines with equal sparking intervals, its movable contact 65A connects the grids of the first tubes 287–288 of the vertical and horizontal synchronization amplifiers 140, 124 through the high resistors 284, 285 to the positive terminal 286 of the source of anode supply voltage for these tubes: its movable contact 65B connects the grid of tube 287 to the input terminal 36 of the oscilloscope through diode 289 and capacitor 290V; and its movable contact 65C connects the grid of tube 288 through capacitor 290H to the adjustable contact of potentiometer 291 whose ungrounded terminal is connected via capacitor 292 to the terminal 37 of the oscilloscope. For this position of switch 65, the oscilloscope can be synchronized only by high-voltage pulses such as those from the spark-ignition circuit of a gasoline engine: low-voltage signals are rejected.

For the No. 2 position of switch 65, which is the setting for testing diesel engines with equal firing intervals of the cylinders, its movable contact 65A connects the grids of contacts 287, 288 to ground through the high resistances 284, 285: its movable contact 65B connects the grid of tube 287 directly to input terminal 36 of the oscilloscope: and its movable contact 65C connects the grid of tube 288 directly to input terminal 37 of the oscilloscope. For this position of switch 65, the low-voltage signals from the transistorized circuitry of network 12 is effective to synchronize the oscilloscope.

For the No. 3 position of switch 65, which is the setting for testing diesel engines with unequal firing intervals, its movable contact 65A connects the grids of tubes 287, 288 to ground through high resistors 284, 285; the movable contact 65B connects the grid of tube 287 directly to input terminal 36 of the oscilloscope: its contact 65C connects the grid of tube 288 directly to input terminal 37 of the oscilloscope: its movable contact 65D connects the additional capacitor 293 in the vertical sweep oscillator circuit 131; and its movable contact 65E connects the additional capacitor 294 in the horizontal sweep oscillator circuit 120.

For the No. 4 position of switch 65, which is the setting for testing gasoline engines with unequal firing intervals, its movable contacts 65A, 65B and 65C provide the same connections to the vertical and horizontal synchronization amplifiers as for the No. 1 position, but its movable contacts 65D, 65E now include the capacitors 293, 294 in the vertical and horizontal sweep oscillator circuits to reduce the rate of rise of their sawtooth outputs. For both No. 1 and No. 4 positions of switch 65, the amplitude of the H-pulses, as arriving at the first tube of amplifier 124, may be varied by adjustment of potentiometer 291 and the amplitude of the V-pulses, as arriving at the first tube of amplifier 287, may be varied by adjustment of potentiometer 295 in the network and additionally including resistors 296 and 297.

Figure 3:
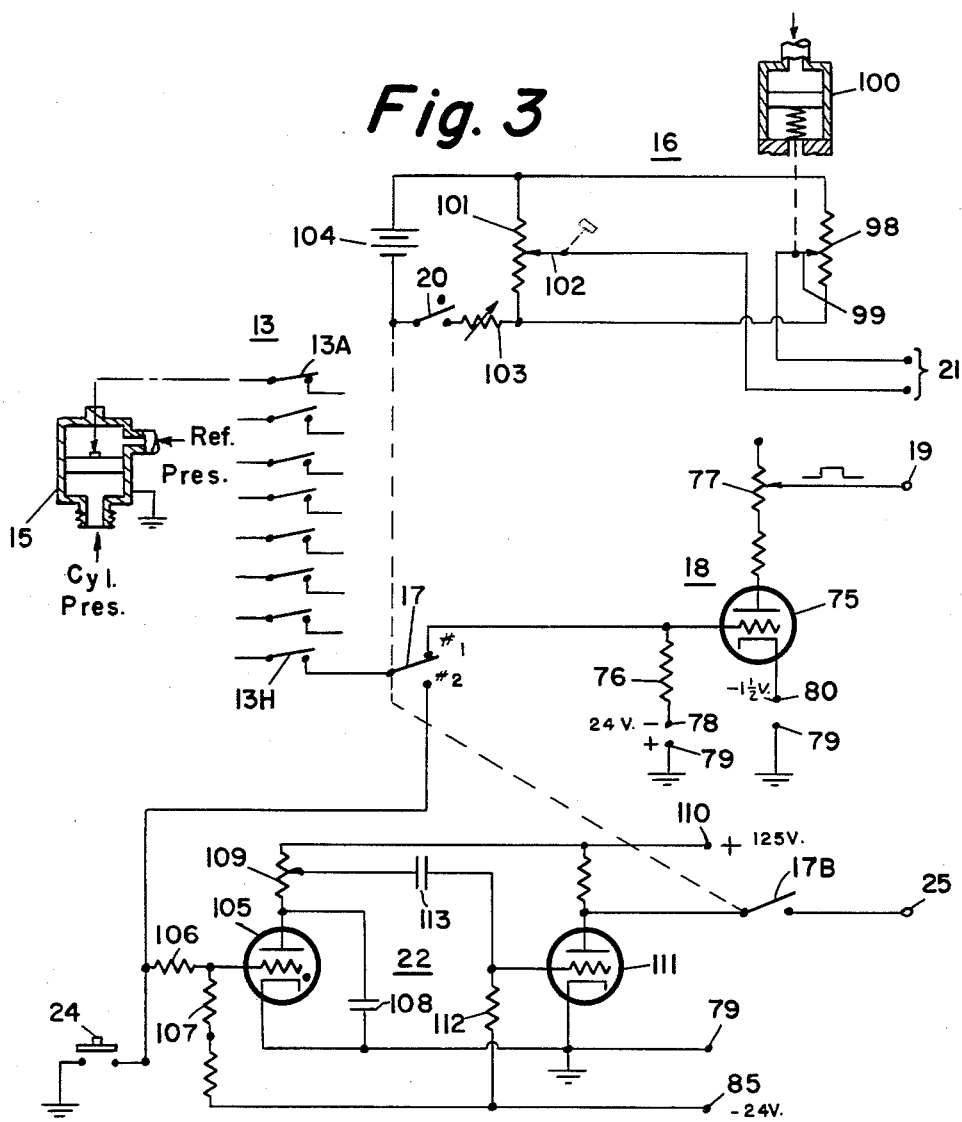

The preferred circuitry of networks 11A, 11B is shown in FIG. 3. Each of the cylinder pressure switches 15 is connected to the movable contact of a corresponding one of the switches 13A–13H of the cylinder-selector 13. With any one or more of switches 13A–13H in closed-circuit position, the corresponding number of cylinder switches 15 is connected to the movable contact of the display-selector switch 17. Assuming switch 17 is thrown to the position shown in FIG. 3 for a square-wave display, the signals of the selected switch or switches 15 are periodically applied to the grid of tube 75 of the square-wave relay 18. This tube is normally biased to cut-off by a suitable source of biasing voltage connected to terminals 78–79. The grid resistor 76 is connected between the negative terminal 78 of such source and the grid of tube 75. The cathode of the tube 75 is also biased negatively with respect to ground by a source connected between the terminals 80 and 79. The anode circuit of the relay tube 75 includes the potentiometer resistor 77 adjustable to vary the size of height of the square-wave occurring when closure of the cylinder pressure switch connects the grid of relay tube 75 to ground.

Figure 4:
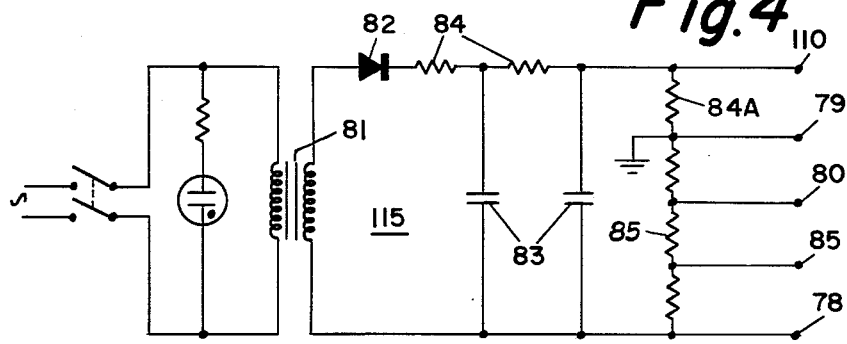
FIG. 4 is a circuit diagram of a power supply for relay and oscillator circuits of FIG. 3.

The biasing voltages for relay tube 75 are derived from the power supply 115 shown in FIG. 4. This supply source includes the power transformer 81 whose A.C. input is converted to smooth direct-current by the rectifier 82 and a filter network including capacitors 83 and resistors 84. The potential-divider 85 across the filter output is tapped to provide at terminals 78, 79 and 80 the biasing potentials applied to the correspondingly numbered terminals (FIG. 3) of the relay tube 75.

The anode voltage of relay tube 75 is derived, as above described, from one of the vertical-deflection plates 60 of the oscilloscope tube 61 (FIG. 2B). The relay tube 75 normally draws no current, and hence does not affect the potential of the vertical-deflection plates 60 except when the grid of tube 75 is grounded by one of the cylinder pressure switches 15. During the interval for which its grid is grounded by a switch 15, the relay tube 75 is effective to decrease the potential of the vertical-deflection plate 60 so to produce, on a raster line, a square-wave display of the unbalanced cylinder pressure (FIGS. 5A–5C; 6A–6C).

The pressure transducer 16, in the form shown in FIG. 3, is a Wheatstone bridge, two of whose adjacent arms are formed by the slidewire 98. The relatively adjustable contact 99 of the slidewire is suitably coupled to the movable element of the pressure-responsive device 100, which may be of type shown in FIG. 4 of the aforesaid Patent 2,085,203. The other two arms of the bridge are formed by the slidewire 101 having a manually adjustable contact 102. For a square-wave display, the contact 102 of slidewire 101 may be set so that with the bridge energized from the D.C. source 104, it is in balance for a selected reference-pressure applied to the cylinder switches 15 and to the pressure-responsive actuator 100 of the bridge slidewire 98. Alternatively, and as shown in FIG. 3, the switch 20 for connecting the source 104 to the bridge may be ganged with switch 17 so that the bridge output voltage applied to the oscilloscope terminals 21 is zero when switch 17 is in the No. 1 position for a square-wave display.

To provide an indicator-card display of the pressure of a selected cylinder (FIGS. 7A–7B; 8A–8B), the pressure switch 15 for that cylinder is connected to the oscillator 22 (FIG. 3) by throwing switch 17 to its No. 2 position and by closing the proper one of switches 13A to 13H of the cylinder selector 13. The vertical sweep oscillator 131 of the oscilloscope is effectively disabled as by opening switch 72 (FIG. 2B) so that all the horizontal time-base lines are superimposed. With the engine running, the valve 9 is progressively or incrementally closed or opened manually or automatically, to vary the reference-pressure applied to the cylinder switches 15 and to the pressure-responsive element 100 of transducer 16. With the balance control 102 of the transducer 16 set at low value, the vertical-deflection signal applied to terminals 21 of the oscilloscope progressively or incrementally changes as a function of reference-pressure and correspondingly vertically shifts the location of the time-base lines so to form a raster, each of whose lines represents a particular reference-pressure. Since the oscillator 22 suppresses visibility of the beam trace for each line (FIG. 9B), except for the interval when the cylinder switch 15 is closed, the resultant display (FIGS. 7A–7B; 8A–8B) defines the relationship between cylinder pressure and piston-position for the selected cylinder and for a selected portion of the cylinder cycle in advance of and beyond the top-dead-center position of the piston. Ordinarily the display is photographed to produce a permanent indicator-card; but if the analyzer is to be used only for temporarily observable indicator-card displays, the C.R. tube 61 may be of type having a long persistence phosphor.

The intensity-control oscillator 22 (FIG. 3) comprises a gaseous discharge tube 105 in a conventional relaxation oscillator circuit including the capacitor 108 connected from cathode to anode and resistors 106, 107 connected from the grid to the negative terminal 78 of the associated power supply 115 (FIG. 4). The anode of tube 105 is connected to the positive terminal 110 of the power supply through load resistor 109 of the potentiometer type. The grid of the amplifier tube 111 is connected via resistor 112 to the negative terminal 85 of the power supply and via blocking capacitor 113 to the adjustable contact of load resistor 109. The anode of amplifier tube 111 is connected to input terminal 25 of the oscilloscope. So long as the oscillator 22 is running, its output as applied through capacitor 67 (FIG. 2B) to the cathode of the C.R. tube 61 is effective to increase brightness of the beam trace so that it becomes clearly visible. The repetition frequency of the oscillator output pulses is high compared to the horizontal sweep frequency: for example, it may be about 10 kilocycles per second.

To provide for operation of oscillator 22 for that interval in each cylinder cycle for which the cylinder pressure exceeds the then applied reference-pressure, the pressure-responsive cylinder switch 15 is connected via the selected one of selector switches 13A–13H and switch 17 to connect the grid of tube 105 to ground through resistor 106 which is in shunt to the grid-biasing circuit including resistor 107 and the negative voltage source between terminals 85–79. In consequence, for the periods during which the selected cylinder switch 15 is closed, the grid of tube 105 is less negatively biased and is in oscillation. The horizontal time-base line for each reference-pressure (FIG. 9B) is consequently normally visible only for that portion of the engine cycle for which the cylinder pressure exceeds the reference-pressure. To make visible a relatively few trace lines C corresponding with particular reference-pressures and so serving as calibration lines for the indicator-card, the operator may press and hold a push button 24 for a brief interval when the reference-pressure, as indicated by gage 114 (FIG. 1), has been set to one of such calibration pressures. As shown in FIG. 3, the closure of switch 24 connects the grid of tube 105 to a ground potential point and so effectively removes the negative bias required for oscillation.

As shown in FIG. 11, each channel 8A–8P of amplifier 8 has its input connected to a corresponding one of the vibration-pickups 27A–27P for detecting the time of fuel-injection of a corresponding cylinder and its output circuit includes an associated one of the attenuators or potentiometers 28A–28P. Each of the gate-selector switches 29A–29P is a two-pole, three-position switch having its movable contacts 145–146 respectively connected to the input and output circuits of the associated one of gates 30A–30P. With any of switches 29A–29P in their upper or No. 1 position, the input of the associated gate is connected by the movable contact 145 of that switch to the adjustable contact of the correspondingly numbered attenuator for the output of the correspondingly numbered amplifier and the output of that gate is connected by movable contact 146 of the switch to the output line 147. With any of switches 29A–29P in its intermediate or No. 2 position, the input and output circuits of the associated gate are both open. For all of these switches, except 29P, the lowermost or No. 3 input contact is connected to the uppermost or No. 1 contact of the next higher numbered switch. Hence, with any of the gate-selector switches, except 29P, in its lowermost or No. 3 position, the input of the associated gate is connected by the movable contact 145 of that switch to the next higher numbered attenuator in the output circuit of the next higher numbered amplifier and the output of that gate is connected by movable contact 146 of that switch to the output line 147. Assuming for example that the raster lines have been synchronized to start at 15° in advance of top-center and to terminate at 30° beyond top-center: if injection occurs within such period and with switches 29A–29P in their #1 position, the injection signal of each cylinder appears on the corresponding line. If at increased speed the injection occurs earlier than −15° because of an automatic injection advance, the gates 30A–30P are not open at time of injection and the injection signals do not appear for the #1 position of the switches. However, by throwing the switches to their #3 position, the injection signals of each signal will appear on the raster line for the preceding cylinder.

The gate-advance switch 90 is a two-pole, six-position switch whose movable contact 149 is connected to the No. 1 contact of switch 29A and whose movable contact 150 is connected to the output line 147 of the selected gate or gates. For the 4-cylinder engine position of switch 90, the input circuit of gate 30D is connected via contact 149 of switch 90 to the No. 1 contact of switch 29A and the output circuit of gate 30D is connected to the output line 147 by contact 150 of switch 90. Similarly, for the 6, 8, 12 and 16-cylinder engine positions of switch 90, the input circuits of the gates 30F, 30H, 30L and 30P are respectively connected via contact 149 of switch 90 to the No. 1 contact of switch 29A.

Each of the gates 30A–30P, as will later appear, may in turn be switched to the ON or conductive state for the duration of one raster line by the stair-counter or shift-register 46. In FIGS. 11, 12, 12C and 12D, the switching lines from the stair-counter 46 of each of gates 30A to 30P are identified by the reference characters 151, 152.

Referring now to FIG. 12, each of the stages 46A–46P of the stair-counter 46 may comprise a bistable multivibrator or flip-flop circuit. In each counting cycle, the first stage 46A is switched to the ON state by a negative V-pulse on line 153, and during its switching to that state produces on lines 151, 152 a voltage shift pulse which switches ON the associated gate 30A. The next occurring H-pulse switches stage 46A to its original ON state, and during its switching produces on lines 151, 152 a pulse which switches OFF the associated gate and also produces on its output line 154 to the next stage (46B) a switching pulse which turns stage 46B to the ON state. During its switching to such state, stage 46B produces on its output lines 151, 152 a pulse which switches the associated gate 30B to the ON state. The next stage pulse switches stage 46B back to its original state, and during such switching that stage produces on its output lines 151, 152 and 154 pulses which turn OFF the associated gate 30B and turn ON the next counter of stage 46C. In like manner, each subsequent H-pulse as appearing on line 155 during a counting cycle is effective sequentially to turn ON and OFF the successive counter stages and associated gates.

At the beginning of the next engine cycle, the appearance of another V-pulse on line 153 to the counter 46 starts a new count at stage 46A and which proceeds as above discussed. It will be understood that for a 16-cylinder, 2-cycle engine a new count will start at the first stage of counter 46 after the old count has been stepped through all sixteen stages: for a 12-cylinder, 2-cycle engine, a new count will start at the first stage of counter 46 as the old count leaves the twelfth stage 30L: for an 8-cylinder, 2-cycle engine, or a 16-cylinder, 4-cycle engine, a new count will start as the old count leaves the eighth stage 30H, etc.

The output lines 156 of the successive stages of counter 46 are respectively connected to the correspondingly numbered fixed contacts of the top-line-selector switch 49. The movable contact 157 of switch 49 is connected to the input terminal 36 of the oscilloscope for synchronization of the vertical sweep oscillator. With the switch 49 set to its No. 1 position, the top line of the raster corresponds with the No. 1 cylinder and the successively lower lines correspond with the other cylinders in their firing sequence. With switch 49 set to its No. 2 position, the top line of the raster corresponds with the last cylinder of the firing sequence; the second top line corresponds with the No. 1 cylinder, and the successively lower lines correspond with the remainder of the cylinders in their firing sequence. Similarly, for any of the other numbered positions of switch 49, the line position of the No. 1 cylinder in the raster corrseponds with the switch position. For example, for an 8-cylinder, 2-cycle engine and with the switch 49 in the No. 8 position, the bottom line of the raster corresponds with the No. 1 cylinder and the top to the seventh lines of the raster respectively correspond with the other seven cylinders in their firing sequence.

With the switch 49 in its OFF position, its movable contact 157 is connected directly to the V-input line 153 of the counter 46. For this test-position of the top line cylinder switch, the vertical synchronization pulses V are passed directly to the oscilloscope terminal 37 and to the line-start switch 23 to by-pass the counter 46.

The line-start switch 23, as will appear from subsequent description of FIG. 12B, is an inverter for synchronizing the ring-counter 50 from the V-pulses. The counter 50 and its associated line-length switch 51 provides a convenient means for changing the number of lines in the scope raster without changing the engine synchronizing pickups. Each of the four stages 50A–50D of counter 50 is a bistable flip-flop circuit. With switch 51 in its No. 1 position, all stages of counter 50 are effectively by-passed and the H-pulses on input line 155 are passed by movable contact 160 of switch 51 directly to terminal 37 of the oscilloscope for synchronization of the horizontal sweep oscillator. With switch 51 in its No. 2 position, the ring-counter 50 resets itself for every two counts and the reset pulse as appearing on output line 163 of stage 50B appears as a synchronizing pulse passed by contact 160 of switch 51 to oscilloscope terminal 37. Similarly, with switch 51 in its No. 3 or No. 4 positions, the scaler 50 resets itself for every three or four counts respectively and the reset pulse as repeated on output line 163 of the corresponding stage 50C or 50D is passed by contact 160 of switch 51 to oscilloscope terminal 37.

With switch 51 in the one-count or No. 1 position, the contact 161 of that switch connects the reset input terminal 164 of stage 50A to the reset output terminal 165 of the stage. With switch 51 in the two-count or No. 2 position, the contact 161 connects the reset input terminal 164 of stage 50A to the reset output terminal 165 of stage 50B. With switch 51 in its three-count or No. 3 position, its contact 161 connects the reset input terminal 164 of stage 50A to the reset output terminal 165 of stage 50C and contact 162 of switch 51 connects the output of the line-start switch 23 to the top-line reset terminal 166 of stage 50B. For this position of switch 51, its contact 160 passes an output pulse from stage 50C to oscilloscope input terminal 37 for every three counts of the H-pulses from amplifier 45. With switch 51 in its No. 4 position, its contact 161 connects the reset terminal 164 of stage 50A to the reset output terminal 165 of stage 50D and its contact 162 connects the output of switch 23 to the top-line reset terminal 166 of stage 50C. For this position of the three-pole, four-position switch 51, its contact 160 passes one output pulse from stage 50D to the oscilloscope terminal 37 for every fourth H-pulse from amplifier 45.

There is now briefly described the preferred circuitry of each of the various system components shown in block in FIGS. 11 and 12.

The test oscillator 91 shown in block in FIGS. 1 and 11 is a Colpitts oscillator (FIG. 11A) utilizing a transistor 170 of the 2N229 type. The base electrode of the transistor is connected to the junction of resistors 171, 172 connected in series between the power supply terminals 173, 174. The emitter electrode of the transistor is connected to grounded terminal 174 through resistor 175 and is also connected to the junction of capacitors 176, 176 of the frequency-determining circuit. The collector electrode of transistor 170 is connected to the D.C. power supply terminal 173 through resistor 178A and the inductor 177 of the frequency-determining circuit. The output circuit of oscillator 91 includes coupling capacitor 178 and the potential-divider resistors 179, 180. The junction of the output resistors 179, 180 is connected to the movable contacts of the test switches 92 (FIG. 11) for applying the test signal to the input circuit of any one or more of the vibration-pickup amplifiers 8A–8P.

Figure 11B:
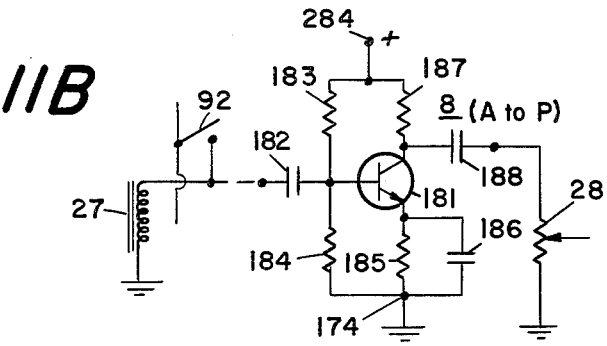

Each of the amplifiers 8A–8P may be, as shown in FIG. 11B, a single stage amplifier including a transistor 181 of the 2N229 type. The base of the transistor is connected through coupling capacitor 182 to the associated vibration-pickup 27 and to the junction of resistors 183, 184 connected in series between the power supply terminals 284, 174. The emitter of the transistor 181 is connected to the ground terminal 174 via resistor 185 which is shunted by the by-pass capacitor 186. The collector of transistor 181 is connected through resistor 187 to the power supply terminal 284 and through the blocking capacitor 188 to the associated output attenuator 28.

Figure 11C:
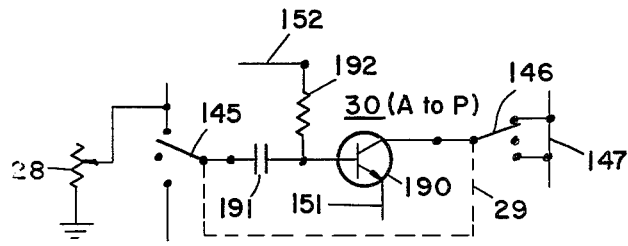
Figure 11D:
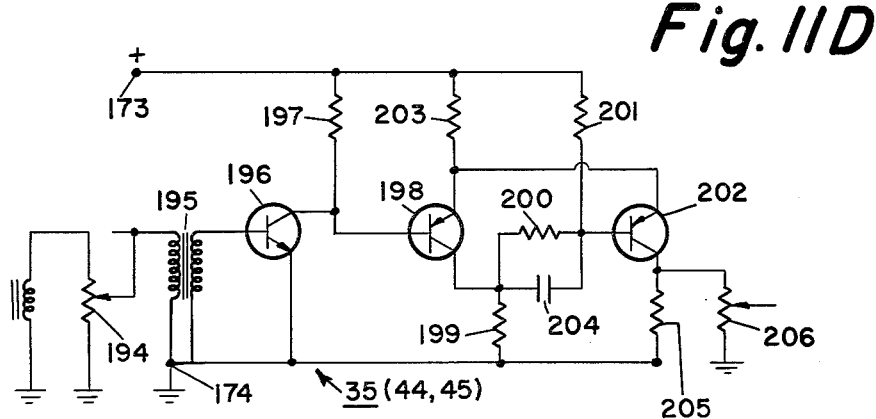

Each of the gates 30A–30P includes, as shown in FIGS. 11C, 12C and 12D, a transistor 190 of the 2N229 type. The collector of the transistor is connected to the movable contact 146 of the associated selector switch 29. The base electrode is connected through blocking capacitor 191 to the movable contact 145 of that switch and also through resistor 192 to the connecting line 152 to the corresponding stage of counter 46. The emitter of transistor 190 of each gate 30A–30P is connected via line 151 to the corresponding stage of counter 46 and to the corresponding point of the top-line-selector switch 49. Each of the amplifiers 35, 44 and 45, as exemplified by the single Schmitt trigger circuit shown in FIG. 11D, includes a transformer 195 whose primary winding is energized from the pickup coil of the associated pulse-generator. The secondary of transformer 195 is connected between the base and emitter electrodes of transistor 196 which may be of the 2N229 type. The collector of transistor 196 is connected through resistor 197 to the current supply terminal 173 and also to the base of the second transistor 198 which may be of the 2N185 type. The base of transistor 198 is connected to the junction of resistors 199 and 200 which together with resistor 201 form a potential-divider across the current supply terminals 173, 174. The emitter of transistor 198 is connected directly to the emitter of a third transistor 202 which may also be of the 2N185 type, and is also connected through resistor 203 to the current supply terminal 173. The base of transistor 202 is connected to the junction of resistors 200, 201, the former being shunted by a small by-pass capacitor 204. The output resistor 205 is connected from the collector of transistor 202 to the ground terminal 174 and may be shunted by the potentiometer 206.

Figure 11E:
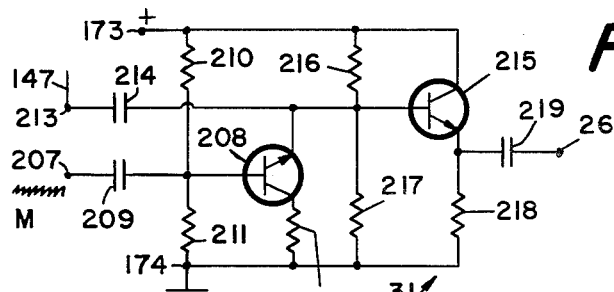

The clipper-mixer 31, as shown in FIG. 11E, includes a transistor 208 which may be of the 2N185 type. The base electrode of the transistor is connected to the marker-input terminal 207 through capacitor 209 and to the junction point of resistors 210, 211 connected in series between the supply terminals 173, 174. The resistors 210, 211 provide a base-bias affording a clipping action. The collector of transistor 208 is connected through resistor 212 to the grounded supply terminal 174. The other input terminal 213 of mixer 31 is connected through capacitor 214 to the emitter of transistor 208, to the base electrode of the second transistor 215, which may be of the 2N229 type, and to the junction of the resistors 216, 217 which are connected in series between the supply terminals 173, 174. The mixer output, with marker pulses of negative polarity, appears across the resistor 218 which is connected from the emitter of transistor 215 to the ground terminal 174. Such output is applied through capacitor 219 and input terminal 26 of the oscilloscope to the driver tubes 68A, 68B of the vertical-deflection amplifier tubes 64A, 64B (FIG. 2B).

The binary scaler 48 of FIGS. 1 and 12, as shown in FIG. 12A, is a flip-flop circuit comprising two transistors 220A, 220B which may be of the 2N229 type. The emitters of both transistors are connected to ground terminal 174 through the resistor 232. The resistors 221A, 222A and 223A connected in series between the current supply terminals 173 and 174 form a divider network with the collector of transistor 220A connected to the junction of resistors 221A, 222A and the base of transistor 220B connected to the junction of resistors 222A, 223A. The similarly connected resistors 221B, 222B, 223B form a like divider network with the collector of transistor 220B connected to the junction of resistors 221B, 222B and the base of transistor 220A connected to the junction of transistors 222B, 223B. The input terminal 227 of the binary scaler 48 is connected through capacitor 228A to the junction of resistor 229A and diode 230A which are connected in series between the collector and base of transistor 220A. The input terminal 227 is similarly connected through capacitor 228B to the junction of resistor 229B and diode 230B which are connected in series between the collector and base of transistor 220B. For each second V-pulse applied to the input terminal 227 of the scaler 48, a pulse appears at the output terminal 231 and, with switch 47 in the position shown in FIG. 12A, is applied via line 153 to the stair-counter 46.

The line-start switch 23, as shown in FIGURE 12B, comprises a transistor 235 which may be of the 2N229 type. The base of the transistor is connected through resistor 236 to the ground terminal 174 and is connected through serially-connected capacitor 237 and resistor 238 to the signal input terminal 239 upon which the top-line synchronizing pulses are impressed. The emitter of transistor 235 is connected to ground terminal 174 through resistor 240. The collector of transistor 235 is connected through the resistor 241 to the ungrounded supply terminal 173 and is also connected through capacitor 242 to the signal output terminal 243. The diode 244 connected between the output terminal 243 and ground is poled to suppress any positive components of the output signal. From the foregoing, it should be clear that the line-start switch 23 amplifies and inverts the V-pulse output of stair-counter 46 and applies it to the ring-counter 50 for synchronization of its H-pulse output.

Except in respects specifically mentioned, all stages 46A–46P of the stair-counter 46 are similar in composition. Accordingly, the following description is generally applicable not only to the first stage 46A (FIG. 12C) but also to each of the other stages 46B–46P, as exemplified by the single stage shown in FIG. 12D. Each stage is a bistable multivibrator or flip-flop circuit comprising two transistors 246A, 246B which may be of the 2N229 type.

the stage is considered to be in the ON state when its transistor 246B is in conductive state and its transistor 246A in the non-conductive state. The emitters of both transistors are connected to ground through the resistor 245. The resistors 247A, 248A, 249A connected in series between the supply terminals 173 and 174 form a divider network with the collector of transistor 246A connected to the junction of resistors 247A, 248A and the base of transistor 246A connected to the junction of resistors 248A, 249A. The similarly connected resistors 247B, 248B, 249B form a like divider network with the collector of transistor 246B connected to the junction of resistors 247B, 248B and the base of transistor 246A connected to the junction of resistors 248B, 249B. The input terminal 250 to which the H-pulses are applied is connected via capacitor 251 and diode 252 to the base electrode of transistor 246A. The input terminal 253 of the first stage 46A (FIG. 12C) to which the V-pulses are applied is connected via capacitor 254 and diode 255 to the base of transistor 246B. The input terminal 256 of each of the other stages (FIG. 12D) to which reset pulses are applied is connected via capacitor 257 directly to the base of transistor 246B.

When the transistor 246B of any stage is switched to the ON state, the change in level of its collector as appearing at output terminal 258 of the stage is effective as applied to input terminal of the next stage to reset it to its ON state, i.e., transistor 246A ON and transistor 246B OFF. Such change in level as applied over input line 152 of the stage to the associated transistor 190 of the corresponding gate is effective to switch that gate to the ON state. When the transistor 246A of any stage of counter 46 is switched to the ON state, the pulse appearing at output terminal 259 of that stage appears on the output line 156 and is available at the corresponding fixed contact of the top-line-selector switch 49.

In each counting cycle, the gates 30A et seq. are in turn switched ON and then OFF, each being in the ON or open state so long as the associated stage of counter 46 is in the ON or open state, i.e., with its transistor 246A "ON" and its transistor 246B "OFF." Specifically, the first stage 46A of counter 46 is switched to the ON state by a negative V-pulse applied via line 153, capacitor 254 and diode 255 to the base of transistor 246B. In consequence, transistor 246B of stage 46A is turned OFF and transistor 246A turns ON with consequent closure of the associated gate 30A. The first stage 46A is switched "OFF" by a negative "H" pulse applied via line 155, capacitor 251 and diode 252 to the base of transistor 246A. In consequence, transistor 246A of stage 46A is switched OFF and transistor 246B is turned ON and the first stage 46A of the counter reverts to its normal "OFF" state with consequent switching of the associated gate 30A to the OFF or open state. When the transistor 246B of the first stage 46A is turned "ON," it produces a negative voltage pulse applied via capacitor 257 to the base of transistor 246B of the second counter stage 46B. In consequence, the transistors 246B and 246A of stage 46B are respectively switched to the OFF and ON states for which the gate 30B is the open or ON state. The next H-pulse as applied via capacitor 251 and diode 252 of stage 46B is effective to turn its transistors 246A and 246B respectively OFF and ON. The gate 30B is thus turned OFF and a signal is sent from transistor 246B of stage 46B to stage 46C to cause that flip-flop to reverse its state and so open gate 30C. In like manner, the successive H-pulses of a counting cycle are effective to turn ON and OFF the other stages of counter 46 in turn with consequent opening and closure of their associated gates. It is to be noted that although the negative H-pulses are concurrently applied to the capacitor 251 and diode 252 of all stages, only the gate-open or ON stage allows the pulse signal to pass the diode to the base of transistor 246A of that stage: it is also to be noted that all gate-closed stages have a reverse bias across their diodes 252 which prevents passage of signal current and loss of signal strength.

All stages 50A–50D of the ring-counter 50 are similar in composition. Accordingly, the following description is generally applicable not only to the first stage 50A, as shown in FIG. 12E, but also to each of the other stages 50B–50D as exemplified by the single stage shown in FIG. 12F. Each stage is a flip-flop circuit comprising two transistors 265A, 265B which may be of the 2N229 type. The emitters of both transistors are connected to the grounded terminal 174 through the resistor 266. The resistors 267A, 268A, 269A connected in series between the supply terminals 173, 174 form a divider network with the collector of transistor 265A connected to the unction of resistors 267A, 268A and the base of transistor 265B connected to the unction of transistors 268A, 269A. The similarly connected resistors 267B, 268B, 269B form a like divider network with the collector of transistor 265B connected to the junction of resistors 267B, 268B and the base of transistor 265A connected to the junction of resistors 268B, 269B. The input terminal 270 to which the H-pulses are applied is connected through capacitor 271 and diode 272 to the base of transistor 265A. The forward reset output terminal 164 is connected to the collector of transistor 265B. In the first stage 50A (FIG. 12E), the reset input terminal 165 is connected to the base of transistor 265B via capacitor 273 and diode 274. A resistor 275 is connected between the collector of transistor 265B and the junction of capacitor 273 and diode 274. In each of the remaining stages (FIG. 12F), the reset input terminal 165 is connected to the base of transistor 265B through the capacitor 275. In the first stage 50A (FIG. 12E), the input terminal 167 to which the top-line reset pulses are applied is connected through diode 276 to the base of transistor 265B whereas in each of the other stages (FIG. 12F), such pulses are applied to input terminal 166 which is connected to the base of transistor 265A through diode 277.

All the transistor circuitry of FIGS. 11A–11E and 12A–12F may be powered from D.C. current supply source 280 shown in FIG. 13. This supply source includes the stepdown transformer 281 whose primary may be energized from a power source such as a commonly available 110-volt, 60-cycle line. The secondary winding of transformer 281 is connected to the A.C. input terminals of a rectifier bridge 282 using silicon diodes. The D.C. output terminals of the bridge are connected to an RC filter network comprising resistors 283 and capacitors 285. The D.C. output of the last filter section, as appearing at terminal 284, is applied to the correspondingly numbered terminal of the preamplifier 8, FIG. 11B. The somewhat higher D.C. output voltage of the preceding filter section as appearing at terminal 173 of the supply source 280 is applied to the correspondingly numbered terminals of the amplifiers 35 and 45, gates 30 and the counters 46 and 50 of FIGS. 11 and 12.

It shall be understood the invention is not limited to the preferred circuitry above described but comprehends equivalents thereof within the scope of the appended claims.

What is claimed is:

1. An engine-analyzer for selectively displaying the pressure/cycle-time characteristic of a selected cylinder of an engine under test and the reference-pressure/cycle-time relationship between different cylinders of an engine comprising a cathode-ray tube, means including a sweep generator synchronized with the cylinder cycles for repeatedly sweeping the cathode-ray beam in a horizontal path, an oscillator coupled to the cathode of said cathode-ray tube and normally in a state corresponding with suppressed visibility of the cathode-ray beam, an electronic relay normally biased to cut-off and coupled to the vertical-deflection circuit of said cathode-ray tube, pressure-responsive switches each responsive to cylinder pressures in excess of a selected reference-pressure, a display-selector switch effective in a first position to connect any selected one of said pressure-responsive switches to said oscillator to change its state for visibility of said beam during cylinder-cycle intervals of excess pressure and effective in a second position to connect a selected number of said pressure-responsive switches to said relay for disabling its cut-off bias during cylinder-cycle intervals of excess cylinder-pressure, means operated with said display-selector switch in said first position to effect incremental changes of said reference-pressure and corresponding vertical shifts of said beam path to produce an indicator-card display of the pressure/cycle-time characteristic of the one selected cylinder, and means including a vertical sweep generator synchronized with the engine cycle and effective for said second position of the display selector switch and a single selected reference-pressure to produce a raster whose vertically spaced lines respectively correspond with the selected cylinders and which displays the intervals for which their pressures exceed the reference-pressure.

2. An engine-analyzer for displaying the reference-pressure/cycle-time relationship between different cylinders of an engine under test comprising a cathode-ray tube, electronic relay means including a tube normally biased to cut-off by a grid-bias source and series resistor, said relay tube having its anode circuit connected to a vertical-deflection electrode of the cathode-ray tube, pressure-responsive switches respectively associated with different cylinders and each connected in parallel to said biasing source and series resistor to disable the cut-off bias of said relay means for that interval of the cycle-time of the corresponding cylinder for which its pressure exceeds a reference pressure, and means including sweep generators respectively synchronized with the engine and cylinder cycles to produce a raster of vertically-spaced lines respectively corresponding with said different cylinders and displaying the cycle-interval for which its pressure exceeds the reference pressure.

3. An engine-analyzer as in claim 2 in which the anode circuit of the relay tube includes resistance means adjustable to vary the extent to which the raster lines are vertically displaced by closure of said pressure-responsive switches.

4. An engine-analyzer as in claim 2 additionally including an amplifier in the vertical-deflection circuit of said cathode-ray tube, and a marker-generator synchronized with said engine and coupled to the vertical-deflection circuit of said cathode-ray tube to produce marker pips on at least one of the raster lines.

5. An engine-analyzer comprising a cathode-ray oscilloscope having vertical and horizontal deflection circuits each including sweep generators, means including first and second pulse generators operated in synchronism with the engine and cylinder cycles for synchronizing said sweep generators to produce a raster whose lines correspond with different cylinders of the engine under test, detectors each respectively responsive to an event occurring in the cycle of a particular cylinder but subject to spurious response to events occurring in other cylinder cycles, and electronic switch means timed by said pulse generators for connecting said detectors individually in turn to said vertical-deflection circuit for an interval corresponding with the raster line length so to preclude display of such spurious responses.

6. An engine-analyzer as in claim 5 in which said detectors are vibration-pickups respectively associated with the fuel-injection lines of different cylinders.

7. An engine-analyzer comprising a cathode-ray oscilloscope having vertical and horizontal deflection circuits respectively including vertical and horizontal sweep generators, means including first and second pulse generators operated in synchronism with the engine and cylinder cycles for synchronizing said sweep generators to produce a raster whose lines correspond with different cylinders of the engine under test, detectors responsive to events occurring in the cylinder cycles, a multistage stair-counter timed by said pulse generators for connecting said detectors in turn to said vertical-deflection circuit for an interval corresponding with the raster line length, and a switch which may be manually set to select any stage of the counter for synchronization of the vertical sweep generator so to predetermine the position in the raster of the line corresponding with any cylinder.

8. An engine-analyzer comprising a cathode-ray oscilloscope having vertical and horizontal deflection circuits each including sweep generators, means including first and second pulse generators operated in synchronism with the engine and cylinder cycles for synchronizing said sweep generators to produce a raster whose lines correspond with different cylinders of the engine under test, detectors responsive to events occurring in the cylinder cycles, electronic switch means timed by said pulse generators for connecting said detectors in turn to said vertical-deflection circuit for an interval corresponding with the raster line length, and a ring-counter interposed between the horizontal sweep generator and the second pulse generator for scaling down the number of generated pulses applied for synchronization thereof so correspondingly to reduce the number of raster lines.

9. An engine-analyzer as in claim 8 additionally including a switch which may be manually set to select the number of generated pulses counted before resetting of the ring-counter and production of a synchronizing pulse for said horizontal sweep generator.

10. An engine-analyzer comprising a cathode-ray oscilloscope having vertical and horizontal deflection circuits respectively including vertical and horizontal sweep generators, means including first and second pulse generators operated in synchronism with the engine and cylinder cycles for synchronizing said sweep generators to produce a raster whose lines correspond with different cylinders of the engine under test, detectors responsive to events occurring in the cylinder cycles, electronic switch means timed by said pulse generators for connecting said detectors in turn to the vertical-deflection circuit for an interval corresponding with the raster line length, said electronic switch means including a stair-counter with a switch which may be manually set to select any count for synchronization of the vertical sweep generator so to predetermine the position in the raster of the line corresponding with any cylinder, a ring-counter triggered by the output pulses of the second pulse generator, and a switch which may be manually set to predetermine the number of pulses required to reset the ring-counter and produce a synchronizing pulse for the horizontal sweep generator with corresponding reduction in the number of raster lines.

11. An engine-analyzer comprising a cathode-ray oscilloscope having vertical and horizontal deflection circuits respectively including vertical and horizontal sweep generators, means including first and second pulse generators operated in synchronism with the engine and cylinder cycles for synchronizing said sweep generators to produce a raster whose lines correspond with different cylinders of the engine under test, detectors responsive to events occurring in the cylinder cycles, and an electronic switch means timed by said pulse generators for connecting said detectors in turn to said vertical-deflection circuit for an interval corresponding with the raster line length, said electronic switch means including a series of electronic gates in number corresponding with the largest cylinder-numbered engine to be tested and each with a manually-operable switch for selectively connecting it to one or the other of two of said detectors whose associated cylinders are in adjacent firing sequence.

12. An engine-analyzer as in claim 11 additionally including a manually-operable switch to connect the output of the detector first in the firing sequence selectively to the input of gates whose position in said series thereof corresponds with the number of cylinders of engines to be tested.

13. An engine-analyzer as in claim 12 additionally including a test oscillator, and switching means for applying the output of said test oscillator upon any of the signal channels afforded by said gates and switches from any of said detectors to the vertical-deflection circuit.

14. An engine-analyzer comprising a cathode-ray oscilloscope having vertical and horizontal deflection circuits each including sweep generators, means including first and second pulse generators operated in synchronism with the engine and cylinder-cycles for synchronizing said sweep generators to produce a raster whose lines correspond with different cylinders of an engine under test, pressure-responsive means respectively associated with cylinders of the engine for producing signals applied to the vertical-deflection circuit for intervals during which cylinder pressure exceeds a reference-pressure, a stair-counter interposed between the vertical sweep generator and the first pulse generator, and a switch which may be manually set to select the output of any stage of the counter for synchronization of the vertical sweep generator and so predetermine the position in the raster of the line corresponding with any cylinder.

15. An engine-analyzer as in claim 14 additionally including a ring-counter interposed between the horizontal sweep generator and the second pulse-generator, and a switch manually set to select which stage of the ring-counter is effective to reset it and to provide a synchronizing pulse for said horizontal sweep generator with corresponding reduction in the number of raster lines.

16. An engine-analyzer comprising a cathode-ray oscilloscope having vertical and horizontal deflection circuits respectively including vertical and horizontal sweep generators, means including first and second pulse-generators operated in synchronism with the engine and cylinder cycles for synchronizing said sweep generators, pressure-detectors respectively associated with cylinders of the engine under test for producing signals during intervals for which cylinder-pressure exceeds a reference-pressure, vibration-responsive detectors respectively associated with the fuel-injection lines of said cylinders, an oscillator coupled to the cathode of the cathode-ray tube and normally in a state corresponding with suppressed visibility of the cathode-ray beam, an electronic relay normally biased to cut-off and connected to a vertical-deflection electrode of said cathode-ray tube, a display-selector switch effective in a first position to connect any selected one of said pressure-detectors to said oscillator to change its state for cylinder-cycle intervals of excess pressure and effective in a second position to connect any selected number of said pressure-detectors to said relay for disabling its cut-off bias during cylinder-cycle intervals of excess pressure, means operated with said display-selector switch in said first position to effect incremental changes of said reference-pressure and corresponding vertical shifts of the beam to produce an indicator-card display for one selected cylinder, electronic switch means comprising a stair-counter in circuit between the vertical sweep generator and the first pulse-generator, and a ring-counter in circuit between said horizontal sweep generator and the second pulse-generator, said electronic switch means being effective for said second position of the display-selector switch to provide a raster whose lines correspond with different cylinders of the engine, switches which may be manually set to connect selected pressure-detectors to the vertical-deflection circuit, switches which may be manually set to connect said vibration-responsive detectors to said vertical-deflection circuit via said stair-counter, a switch which may be manually set to select the output of any stage of the counter for synchronization of the vertical sweep generator so to predetermmine the position in the raster of the line corresponding with any cylinder, and a switch manually set to select which stage of the ring-counter is effective to reset it and provide a synchronizing pulse for said horizontal sweep generator with corresponding reduction in the number of raster lines.

References Cited by the Examiner

UNITED STATES PATENTS

| | | | |
|---|---|---|---|
| 2,085,203 | 6/1937 | Schlesman et al. | 73—115 |
| 2,355,363 | 8/1944 | Christaldi | 73—35 X |
| 2,438,717 | 3/1948 | Puckette | 315—3 |
| 2,608,093 | 8/1952 | Traver | 73—116 |
| 2,688,126 | 8/1954 | Weller | 73—116 X |
| 2,688,127 | 8/1954 | Sargeant et al. | 73—116 X |
| 2,919,576 | 1/1960 | Weller et al. | 73—115 |
| 2,987,649 | 6/1961 | Watson | 315—30 |

FOREIGN PATENTS 740,087 11/1955 Great Britain.

RICHARD C. QUEISSER, *Primary Examiner.*